(12) United States Patent
Hooda et al.

(10) Patent No.: US 12,021,748 B2
(45) Date of Patent: Jun. 25, 2024

(54) EXIT INTERFACE SELECTION BASED ON INTERMEDIATE PATHS

(71) Applicant: Cisco Technology, Inc., San Jose, CA (US)

(72) Inventors: Sanjay Kumar Hooda, Pleasanton, CA (US); Anoop Vetteth, Fremont, CA (US); Himanshu Mehra, Saratoga, CA (US); Rajeev Kumar, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 517 days.

(21) Appl. No.: 17/390,677

(22) Filed: Jul. 30, 2021

(65) Prior Publication Data

US 2023/0029882 A1 Feb. 2, 2023

(51) Int. Cl.
| | |
|---|---|
| *H04L 12/721* | (2013.01) |
| *H04L 12/26* | (2006.01) |
| *H04L 43/0829* | (2022.01) |
| *H04L 43/0852* | (2022.01) |
| *H04L 43/087* | (2022.01) |
| *H04L 45/00* | (2022.01) |

(52) U.S. Cl.
CPC .......... *H04L 45/70* (2013.01); *H04L 43/0829* (2013.01); *H04L 43/0858* (2013.01); *H04L 43/087* (2013.01)

(58) Field of Classification Search
CPC . H04L 45/70; H04L 43/0829; H04L 43/0858; H04L 43/087
USPC .......................................... 370/252
See application file for complete search history.

(56) References Cited

U.S. PATENT DOCUMENTS

| | | | |
|---|---|---|---|
| 2010/0061231 A1* | 3/2010 | Harmatos | H04L 45/124 370/228 |
| 2015/0113164 A1 | 4/2015 | Butler et al. | |
| 2017/0207996 A1* | 7/2017 | Lui | H04L 43/0829 |
| 2018/0248762 A1 | 8/2018 | Freimuth et al. | |
| 2020/0033638 A1 | 1/2020 | Yahagi et al. | |
| 2020/0351195 A1 | 11/2020 | Goel | |

FOREIGN PATENT DOCUMENTS

CN 111064661 4/2020

* cited by examiner

*Primary Examiner* — Gbemileke J Onamuti
(74) *Attorney, Agent, or Firm* — Polsinelli P.C.

(57) ABSTRACT

Systems, methods, and computer-readable media are provided for performing secure frame encryption as a service. For instance, a network edge device can determine at least a first path and a second path for routing a data packet. The network edge device can obtain a first plurality of values for at least one network metric, wherein the first plurality of values corresponds to the first path and at least a first backup path associated with the first path. The network edge device can obtain a second plurality of values for the at least one network metric, wherein the second plurality of values corresponds to the second path and at least a second backup path associated with the second path. The network edge device can select one of the first path or the second path for routing the data packet based on a comparison of the first plurality of values and the second plurality of values.

20 Claims, 8 Drawing Sheets

EXIT INTERFACE SELECTION BASED ON INTERMEDIATE PATHS

TECHNICAL FIELD

The subject matter of this disclosure relates in general to the field of computer networking, and more particularly, to systems and methods for selecting an exit interface based on network metrics associated with intermediate paths.

BACKGROUND

Wide Area Network (WAN) standards include, for example, Software-Defined Wide Area Network (SD-WAN), digital subscriber line (DSL), multiprotocol label switching (MPLS), among others. WANs can be used to connect local area networks (LANs) allowing devices in one location to communicate with devices in other locations. In some cases, a WAN can be connected to multiple service providers (e.g., internet service providers) that can be used to provide network connectivity.

Devices in WANs can access cloud computing resources outside of the WAN via the service provider network. In general, cloud computing refers to the use of computing resources (e.g., hardware and software) that are delivered as a service over a network such as the Internet. Distributed applications can generally be delivered using cloud computing techniques. For example, distributed applications can be provided using a cloud computing model, in which users are provided access to application software and/or databases over a network. The cloud providers (e.g., an internet service provider (ISP)) generally manage the infrastructure on which the applications run. As a result, performance of the cloud infrastructure (e.g., network paths through an ISP) directly affects the performance of cloud computing applications.

BRIEF DESCRIPTION OF THE FIGURES

To provide a more complete understanding of the present disclosure and features and advantages thereof, reference is made to the following description, taken in conjunction with the accompanying drawings, in which.

DESCRIPTION OF EXAMPLE EMBODIMENTS

Figure 1:
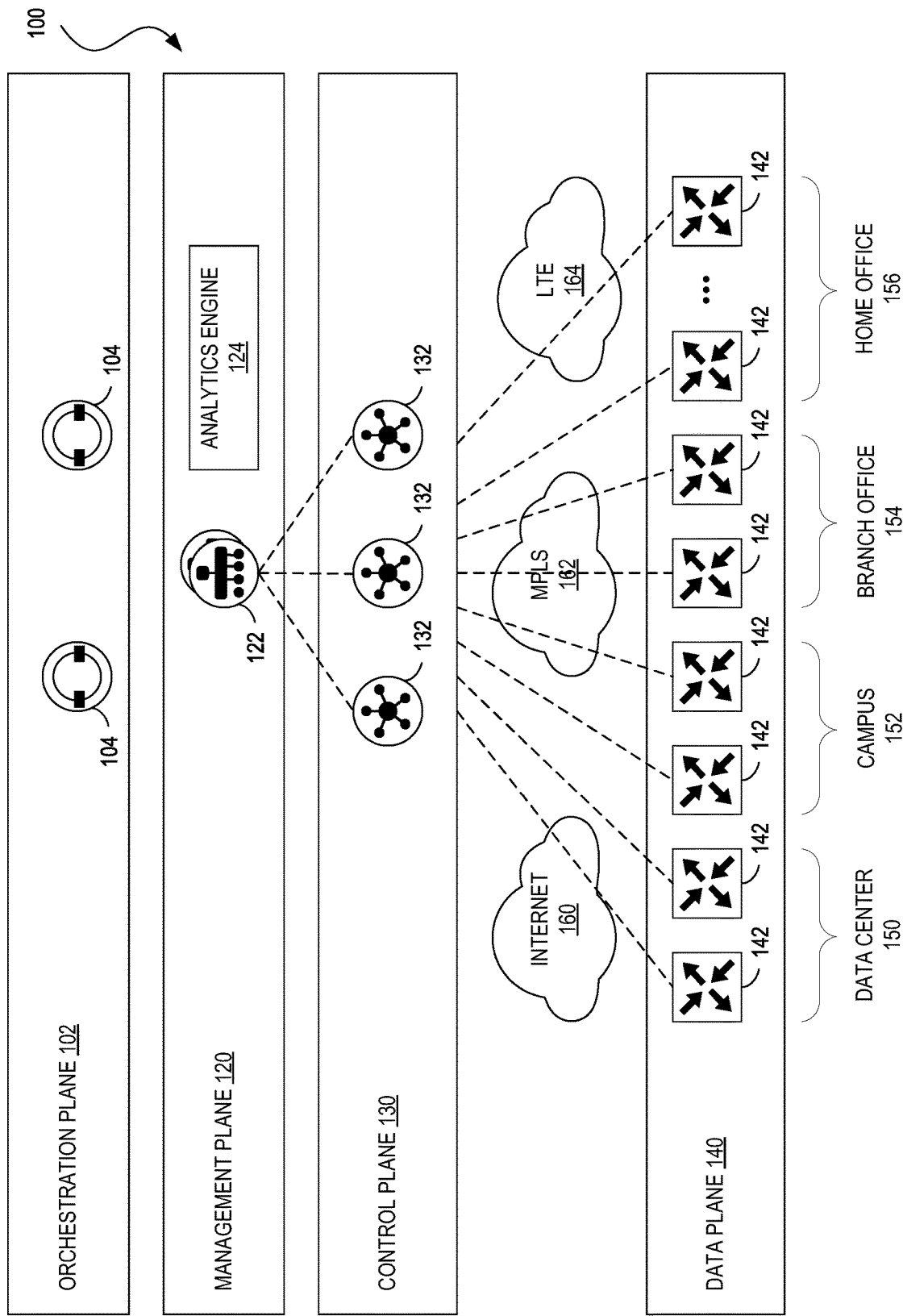
FIG. 1 illustrates an example of a high-level network architecture in accordance with some examples.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Disclosed herein are systems, methods, and computer-readable media for selecting an exit interface based on intermediate paths. An example method can include determining, at a network edge device, at least a first path and a second path for routing a data packet; obtaining a first plurality of values for at least one network metric, wherein the first plurality of values corresponds to the first path and at least a first backup path associated with the first path; obtaining a second plurality of values for the at least one network metric, wherein the second plurality of values corresponds to the second path and at least a second backup path associated with the second path; and selecting one of the first path or the second path for routing the data packet based on a comparison of the first plurality of values and the second plurality of values.

An example system can include one or more processors and at least one computer-readable storage medium storing instructions which, when executed by the one or more processors, cause the one or more processors to determine at least a first path and a second path for routing a data packet; obtain a first plurality of values for at least one network metric, wherein the first plurality of values corresponds to the first path and at least a first backup path associated with the first path; obtain a second plurality of values for the at least one network metric, wherein the second plurality of values corresponds to the second path and at least a second backup path associated with the second path; and select one of the first path or the second path for routing the data packet based on a comparison of the first plurality of values and the second plurality of values.

An example non-transitory computer-readable storage medium having stored therein instructions which, when executed by a processor, cause the processor to determine, at a network edge device, at least a first path and a second path for routing a data packet; obtain a first plurality of values for at least one network metric, wherein the first plurality of values corresponds to the first path and at least a first backup path associated with the first path; obtain a second plurality of values for the at least one network metric, wherein the second plurality of values corresponds to the second path and at least a second backup path associated with the second path; and select one of the first path or the second path for routing the data packet based on a comparison of the first plurality of values and the second plurality of values.

Example Embodiments

Cloud computing generally refers to the use of computing resources (e.g., hardware and software) that are delivered as a service over a network such as the Internet. Distributed applications can generally be delivered using cloud computing techniques. For example, distributed applications can be provided using a cloud computing model, in which users are provided access to application software and/or databases over a network. The cloud providers (e.g., an internet service provider (ISP)) generally manage the infrastructure on which the applications run.

Consequently, performance of the cloud infrastructure directly affects the performance of cloud computing applications. For example, different paths through the network can be associated with different network metrics (e.g., packet loss, latency, and/or jitter) that can affect the performance of an application. Current solutions for determining such metrics include bi-directional forwarding detection (BFD), in which two endpoints establish a session and exchange packets that can be used to measure network metrics. However, when a failure occurs (e.g., on an intermediate device), network traffic is redirected to backup paths that are associated with different levels of such metrics that are unknown. Therefore, it would be advantageous to select an exit interface based on network metrics associated with the primary path as well as the corresponding intermediate or back-up paths.

The present technology provides systems and techniques for a network device (e.g., router, switch, etc.) to select an exit interface based on network metrics associated with one or more intermediate paths. In one aspect, an edge device can communicate with a server to obtain one or more network metrics associated with multiple paths and their corresponding back-up paths. In some examples, an edge device can select an exit interface based at least in part on the network metrics associated with the back-up paths.

As further described below, the disclosed technology provides systems, methods, and computer-readable media for selecting an exit interface based on intermediate paths. Examples will be described herein using a Software Defined Wide Area Network (SD-WAN) as an illustrative example. However, the systems and techniques are not limited to SD-WAN environments and can be implemented using other network configurations.

FIG. 1 illustrates an example of a network architecture 100 for implementing aspects of the present technology. An example of an implementation of the network architecture 100 is the Cisco® SDWAN architecture. However, one of ordinary skill in the art will understand that, for the network architecture 100 and any other system discussed in the present disclosure, there can be additional or fewer components in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 120, a control plane 130, and a data plane 140. The orchestration plane 102 can assist in the automatic on-boarding of edge network devices 142 (e.g., switches, routers, etc.) in an overlay network. The orchestration plane 102 can include one or more physical or virtual network orchestrator appliances 104. The network orchestrator appliance(s) 104 can perform the initial authentication of the edge network devices 142 and orchestrate connectivity between devices of the control plane 130 and the data plane 140. In some embodiments, the network orchestrator appliance(s) 104 can also enable communication of devices located behind Network Address Translation (NAT). In some embodiments, physical or virtual Cisco® SD-WAN vBond appliances can operate as the network orchestrator appliance(s) 104.

The management plane 120 can be responsible for central configuration and monitoring of a network. The management plane 120 can include one or more physical or virtual network management appliances 122. In some embodiments, the network management appliance(s) 122 can provide centralized management of the network via a graphical user interface to enable a user to monitor, configure, and maintain the edge network devices 142 and links (e.g., Internet transport network 160, MPLS network 162, 4G/LTE network 164) in an underlay and overlay network. The network management appliance(s) 122 can support multi-tenancy and enable centralized management of logically isolated networks associated with different entities (e.g., enterprises, divisions within enterprises, groups within divisions, etc.). Alternatively, or in addition, the network management appliance(s) 122 can be a dedicated network management system for a single entity. In some embodiments, physical or virtual Cisco® SD-WAN vManage appliances can operate as the network management appliance(s) 122.

The control plane 130 can build and maintain a network topology and make decisions on where traffic flows. The control plane 130 can include one or more physical or virtual network controller appliance(s) 132. The network controller appliance(s) 132 can establish secure connections to each edge network device 142 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network controller appliance(s) 132 can operate as route reflectors. The network controller appliance(s) 132 can also orchestrate secure connectivity in the data plane 140 between and among the edge network devices 142. For example, in some embodiments, the network controller appliance(s) 132 can distribute crypto key information among the network device(s) 142. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network controller appliance(s) 132.

The data plane 140 can be responsible for forwarding packets based on decisions from the control plane 130. The data plane 140 can include the edge network devices 142, which can be physical or virtual network devices. The edge network devices 142 can operate at the edges various network environments of an organization, such as in one or more data centers or colocation centers 150, campus networks 152, branch office networks 154, home office networks 154, and so forth, or in the cloud (e.g., Infrastructure as a Service (IaaS), Platform as a Service (PaaS), SaaS, and other cloud service provider networks). The edge network devices 142 can provide secure data plane connectivity among sites over one or more WAN transports, such as via one or more Internet transport networks 160 (e.g., Digital Subscriber Line (DSL), cable, etc.), MPLS networks 162 (or other private packet-switched network (e.g., Metro Ethernet, Frame Relay, Asynchronous Transfer Mode (ATM), etc.), mobile networks 164 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 142 can be responsible for traffic forwarding, security, encryption, quality of service (QoS), and routing (e.g., BGP, OSPF, etc.), among other tasks. In some embodiments, physical or virtual Cisco® SD-WAN vEdge routers can operate as the edge network devices 142.

Figure 2:
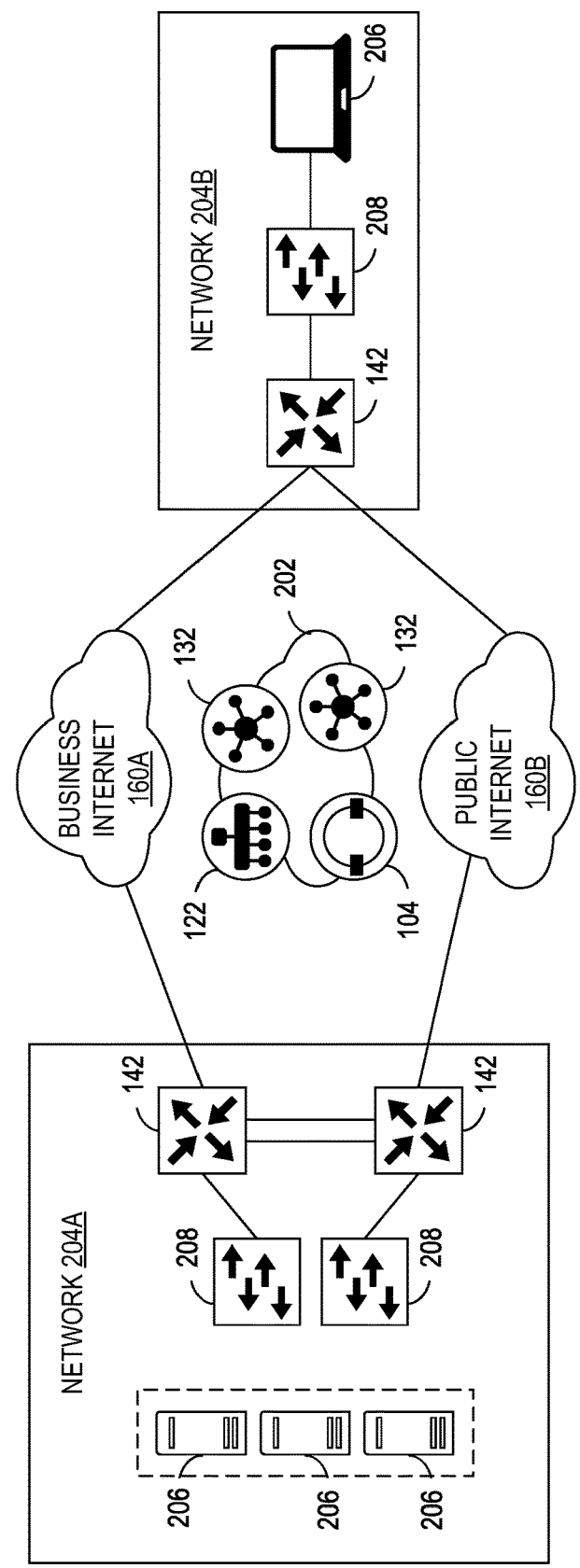
FIG. 2 illustrates an example of a network topology in accordance with some examples.

FIG. 2 illustrates an example of a network topology 200 for showing various aspects of the network architecture 100. The network topology 200 can include a management network 202, a pair of network sites 204A and 204B (collectively, 204) (e.g., the data center(s) 150, the campus network(s) 152, the branch office network(s) 154, the home office network(s) 156, cloud service provider network(s), etc.), and a pair of Internet transport networks 160A and 160B (collectively, 160). The management network 202 can include one or more network orchestrator appliances 104, one or more network management appliance 122, and one or more network controller appliances 132. Although the management network 202 is shown as a single network in this example, one of ordinary skill in the art will understand that each element of the management network 202 can be distributed across any number of networks and/or be co-located with the sites 204. In this example, each element of the management network 202 can be reached through either transport network 160A or 160B.

Each site can include one or more endpoints 206 connected to one or more site network devices 208. The endpoints 206 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 206 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

The site network devices 208 can include physical or virtual switches, routers, and other network devices. Although the site 204A is shown including a pair of site network devices and the site 204B is shown including a single site network device in this example, the site network devices 208 can comprise any number of network devices in any network topology, including multi-tier (e.g., core, distribution, and access tiers), spine-and-leaf, mesh, tree, bus, hub and spoke, and so forth. For example, in some embodiments, one or more data center networks may implement the Cisco® Application Centric Infrastructure (ACI) architecture and/or one or more campus networks may implement the Cisco® Software Defined Access (SD-Access or SDA) architecture. The site network devices 208 can connect the endpoints 206 to one or more edge network devices 142, and the edge network devices 142 can be used to directly connect to the transport networks 160.

In some embodiments, "color" can be used to identify an individual WAN transport network, and different WAN transport networks may be assigned different colors (e.g., mpls, private1, biz-internet, metro-ethernet, lte, etc.). In this example, the network topology 200 can utilize a color called "biz-internet" for the Internet transport network 160A and a color called "public-internet" for the Internet transport network 160B.

In some embodiments, each edge network device 208 can form a Datagram Transport Layer Security (DTLS) or TLS control connection to the network controller appliance(s) 132 and connect to any network control appliance 132 over each transport network 160. In some embodiments, the edge network devices 142 can also securely connect to edge network devices in other sites via IPSec tunnels. In some embodiments, the BFD protocol may be used within each of these tunnels to detect loss, latency, jitter, and path failures.

On the edge network devices 142, color can be used help to identify or distinguish an individual WAN transport tunnel (e.g., no same color may be used twice on a single edge network device). Colors by themselves can also have significance. For example, the colors metro-ethernet, mpls, and private1, private2, private3, private4, private5, and private6 may be considered private colors, which can be used for private networks or in places where there is no NAT addressing of the transport IP endpoints (e.g., because there may be no NAT between two endpoints of the same color). When the edge network devices 142 use a private color, they may attempt to build IPSec tunnels to other edge network devices using native, private, underlay IP addresses. The public colors can include 3g, biz, internet, blue, bronze, custom1, custom2, custom3, default, gold, green, lte, public-internet, red, and silver. The public colors may be used by the edge network devices 142 to build tunnels to post-NAT IP addresses (if there is NAT involved). If the edge network devices 142 use private colors and need NAT to communicate to other private colors, the carrier setting in the configuration can dictate whether the edge network devices 142 use private or public IP addresses. Using this setting, two private colors can establish a session when one or both are using NAT.

Figure 3:
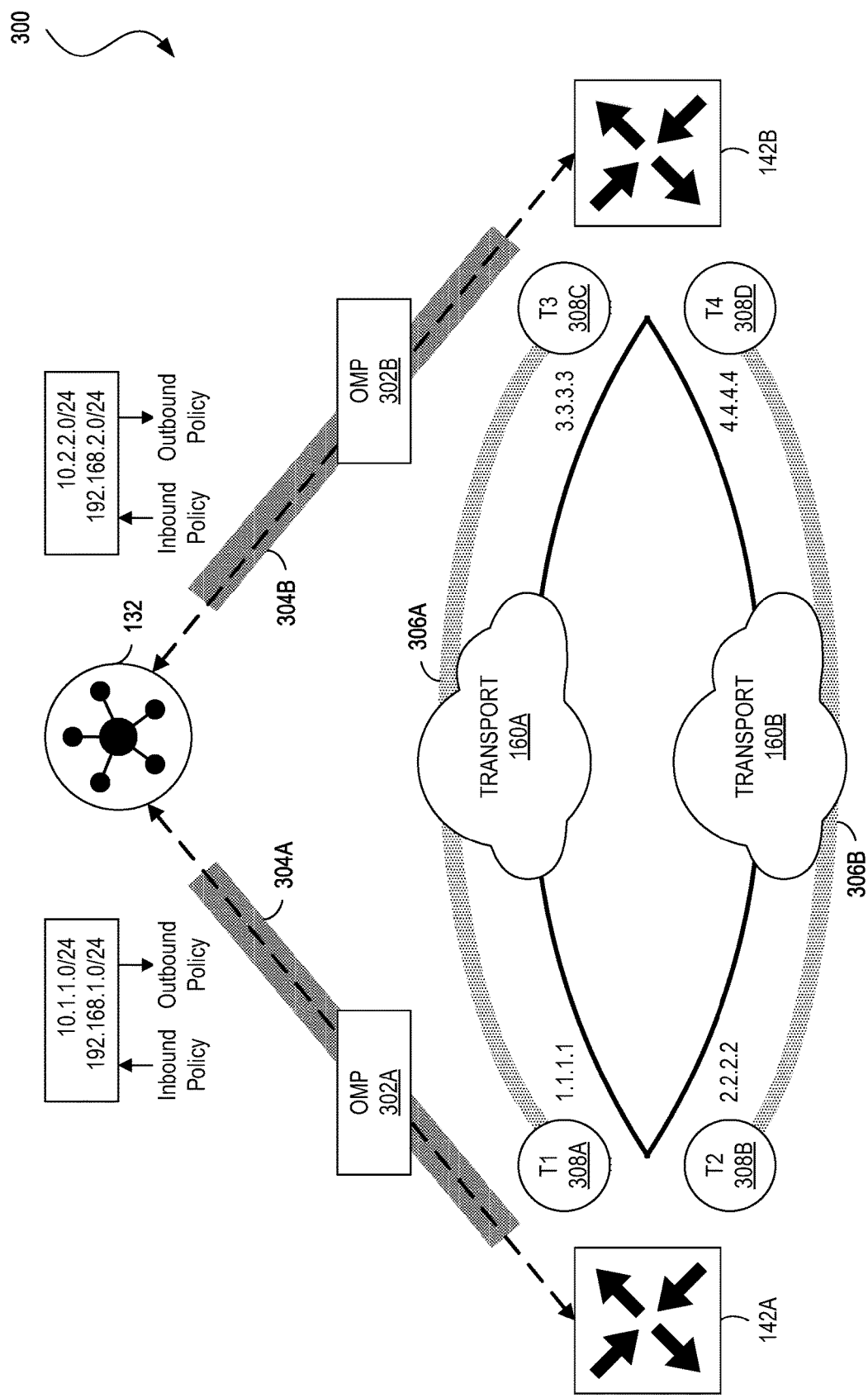
FIG. 3 illustrates an example of a diagram showing the operation of a protocol for managing an overlay network in accordance with some examples.

FIG. 3 illustrates an example of a diagram 300 showing the operation of an Overlay Management Protocol (OMP), which may be used in some embodiments to manage an overlay of a network (e.g., the network architecture 100). In this example, OMP messages 302A and 302B (collectively, 302) may be transmitted back and forth between the network controller appliance 132 and the edge network devices 142A and 142B, respectively, where control plane information, such as route prefixes, next-hop routes, crypto keys, policy information, and so forth, can be exchanged over respective secure DTLS or TLS connections 304A and 304B. The network controller appliance 132 can operate similarly to a route reflector. For example, the network controller appliance 132 can receive routes from the edge network devices 142, process and apply any policies to them, and advertise routes to other edge network devices 142 in the overlay. If there is no policy defined, the edge network devices 142 may behave in a manner similar to a full mesh topology, where each edge network device 142 can connect directly to another edge network device 142 at another site and receive full routing information from each site.

OMP can advertise three types of routes:

OMP routes, which can correspond to prefixes that are learned from the local site, or service side, of the edge network device 142. The prefixes can be originated as static or connected routes, or from within, for example, the OSPF or BGP protocols, and redistributed into OMP so they can be carried across the overlay. OMP routes can advertise attributes such as transport location (TLOC) information (which can similar to a BGP next-hop IP address) and other attributes such as origin, originator, preference, site identifier, tag, and virtual private network (VPN). An OMP route may be installed in the forwarding table if the TLOC to which it points is active.

TLOC routes, which can correspond to logical tunnel termination points on the edge network devices 142 that connect into the transport networks 160. In some embodiments, a TLOC route can be uniquely identified and represented by a three-tuple, including an IP address, link color, and encapsulation (e.g., Generic Routing Encapsulation (GRE), IPSec, etc.). In addition to system IP address, color, and encapsulation, TLOC routes can also carry attributes such as TLOC private and public IP addresses, carrier, preference, site identifier, tag, and weight. In some embodiments, a TLOC may be in an active state on a particular edge network device 142 when an active BFD session is associated with that TLOC.

Service routes, which can represent services (e.g., firewall, distributed denial of service (DDoS) mitigator, load balancer, intrusion prevent system (IPS), intrusion detection systems (IDS), WAN optimizer, etc.) that may be connected to the local sites of the edge network devices 142 and accessible to other sites for use with service insertion. In addition, these routes can also include VPNs; the VPN labels can be sent in an update type to tell the network controller appliance 132 what VPNs are serviced at a remote site.

In the example of FIG. 3, OMP is shown running over the DTLS/TLS tunnels 304 established between the edge network devices 142 and the network controller appliance 132. In addition, the diagram 300 shows an IPSec tunnel 306A established between TLOC 308A and 308C over the WAN transport network 160A and an IPSec tunnel 306B established between TLOC 308B and TLOC 308D over the WAN transport network 160B. Once the IPSec tunnels 306A and 306B are established, BFD can be enabled across each of them.

Figure 4:
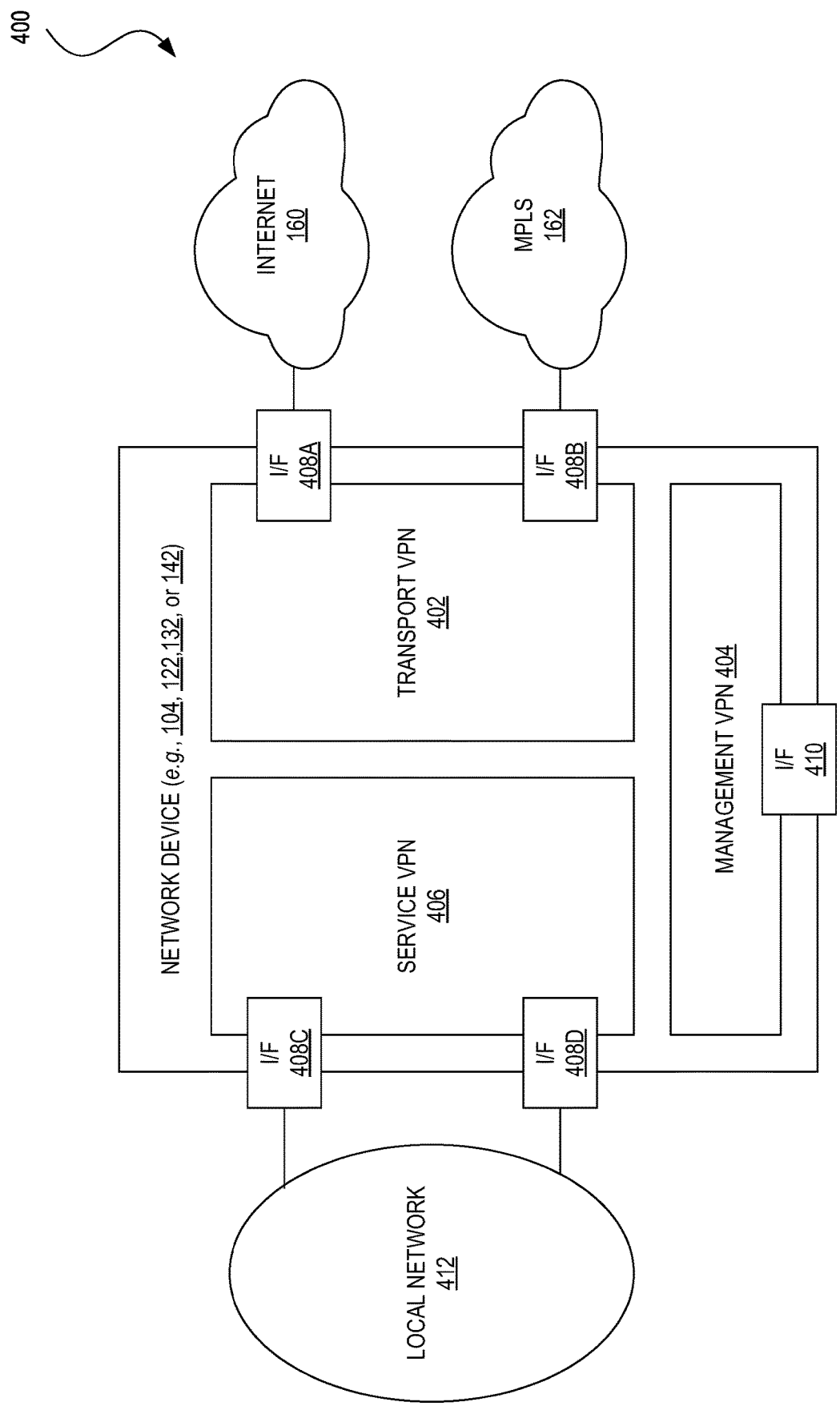
FIG. 4 illustrates an example of a diagram showing the operation of virtual private networks for segmenting a network in accordance with some examples.

FIG. 4 illustrates an example of a diagram 400 showing the operation of VPNs, which may be used in some embodiments to provide segmentation for a network (e.g., the network architecture 100). VPNs can be isolated from one another and can have their own forwarding tables. An interface or sub-interface can be explicitly configured under a single VPN and may not be part of more than one VPN. Labels may be used in OMP route attributes and in the packet encapsulation, which can identify the VPN to which a packet belongs. The VPN number can be a four-byte integer with a value from 0 to 65530. In some embodiments, the network orchestrator appliance(s) 104, network management appliance(s) 122, network controller appliance(s) 132, and/or edge network device(s) 142 can each include a transport VPN 402 (e.g., VPN number 0) and a management VPN 404 (e.g., VPN number 512). The transport VPN 402 can include one or more physical or virtual network interfaces (e.g., network interfaces 410A and 410B) that respectively connect to WAN transport networks (e.g., the MPLS network 162 and the Internet transport network 160). Secure DTLS/TLS connections to the network controller appliance(s) 132 or between the network controller appliance(s) 132 and the network orchestrator appliance(s) 104 can be initiated from the transport VPN 402. In addition, static or default routes or a dynamic routing protocol can be configured inside the transport VPN 402 to get appropriate next-hop information so that the control plane 130 may be established and IPSec tunnels 306 (not shown) can connect to remote sites.

The management VPN 404 can carry out-of-band management traffic to and from the network orchestrator appliance(s) 104, network management appliance(s) 122, network controller appliance(s) 132, and/or edge network device(s) 142 over a network interface 410C. In some embodiments, the management VPN 404 may not be carried across the overlay network.

In addition to the transport VPN 402 and the management VPN 404, the network orchestrator appliance(s) 104, network management appliance(s) 122, network controller appliance(s) 132, or edge network device(s) 142 can also include one or more service-side VPNs 406. The service-side VPN 406 can include one or more physical or virtual network interfaces (e.g., network interfaces 410D and 410E) that connect to one or more local-site networks 412 and carry user data traffic. The service-side VPN(s) 406 can be enabled for features such as OSPF or BGP, Virtual Router Redundancy Protocol (VRRP), QoS, traffic shaping, policing, and so forth. In some embodiments, user traffic can be directed over IPSec tunnels to other sites by redistributing OMP routes received from the network controller appliance(s) 132 at the site 412 into the service-side VPN routing protocol. In turn, routes from the local site 412 can be advertised to other sites by advertising the service VPN routes into the OMP routing protocol, which can be sent to the network controller appliance(s) 132 and redistributed to other edge network devices 142 in the network. Although the network interfaces 410A-E (collectively, 410) are shown to be physical interfaces in this example, one of ordinary skill in the art will appreciate that the interfaces 410 in the transport and service VPNs can also be sub-interfaces instead.

Figure 5:
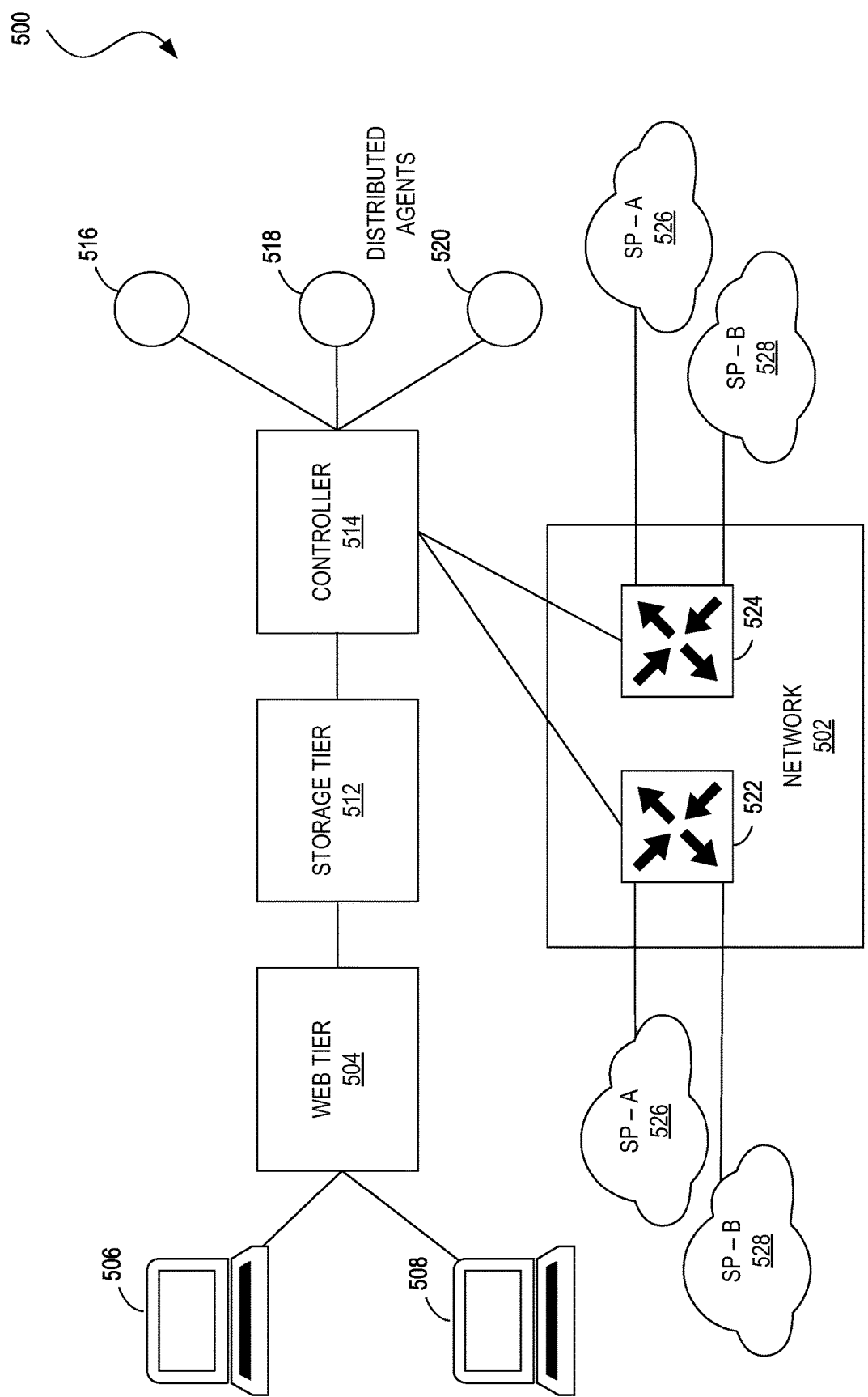
FIG. 5 illustrates an example of a network configuration in accordance with some examples.

FIG. 5 illustrates an example of system architecture 500 for implementing aspects of the present technology. In some examples, system architecture 500 can include network site 502 (e.g., data center 150, campus network 152, branch office network 154, home office network 156, etc.). In some aspects, network site 502 can include one or more site network devices (not illustrated) that connect endpoints (not illustrated) to one or more edge network devices (e.g., edge network device 522 and edge network device 524). In some cases, edge network device 522 and/or edge network device 524 can have multiple interfaces that can be connected to different service providers. For example, edge network device 522 and/or edge network device 524 can have ingress and/or egress interfaces that communicate with service provider 'A' 526 and/or service provider 'B' 528.

In some examples, system architecture 500 can include a controller 514 that can be configured to determine one or more network metrics (e.g., packet loss, latency, jitter, etc.) associated with one or more network paths (e.g., paths to a destination server) using service provider 'A' 526 and/or service provider 'B' 528. In some examples, controller 514 can include an SD-WAN controller (e.g., controller appliance 132). In some aspects, controller 514 can include a server or controller associated with network intelligence software configured to analyze the performance of a local and/or a wide area network (e.g., the Internet) such as a THOUSANDEYES® controller.

In some cases, controller 514 can configure one or more distributed agents (e.g., distributed agents 516-520) to collect data based on one or more tests. In some aspects, distributed agents 516-520 can be distributed across various geographies and/or devices for performing different types of tests and/or targeting different sites, locations, and/or metrics. In some examples, controller 514 can store the data it receives from distributed agents 516-520 in storage tier 512 that can be used by a web tier 504 to generate visualizations and reports to client devices (e.g., client device 506 and/or client device 508).

In some embodiments, controller 514 can configure distributed agents 516-520 to perform various tests to determine network paths and/or network metrics associated with SP-A 526 and/or SP-B 528. In some aspects, tests can be configured to facilitate cross-layer visibility and troubleshooting of application delivery associated with a distributed application(s). In some examples, network tests can include data path measurement tests, routing path measurement tests, and end-to-end network metrics tests. In some cases, Domain Name Server (DNS) tests can include per name server testing and Domain Name System Security Extensions (DNSSEC) bottom-up validation tests. In some configurations, hypertext transfer protocol (HTTP) tests can include testing of steps of a Uniform Resource Locator (URL) fetch. In some cases, page load tests can include testing of a load of an entire web page using a web browser.

In some aspects, the response time of network level metrics from a network server (e.g., via SP-A 526 and/or SP-B 528) can be measured using one or more TCP SYN (transmission control protocol synchronize) packets. For example, providing one or more TCP SYN packets can be used to obtain an indication of response time of network level metrics. In some aspects, a server may throttle connections with TCP SYN packets in a similar manner as other network traffic. In some cases, measuring response time of network level metrics from a network server can include using ping/Internet Control Message Protocol (ICMP) techniques.

In some examples, distributed agents 516-520 can measure end-to-end network properties to a destination (e.g., a network device, an application endpoint, a service endpoint, a host, etc.) by implementing active network monitoring and/or active network probing techniques. In some aspects, distributed agents 516-520 can determine one or more network paths to a destination (e.g., using SP-A 526 and/or SP-B 528). In some cases, distributed agents 516-520 can determine one or more network metrics associated with a network path (e.g., including intermediate nodes).

In one illustrative example, distributed agents 516-520 can identify a server by host name (or IP address) and TCP port number. Periodically, a train of TCP SYN packets can be sent to a server from each distributed agent 516-520. In some examples, distributed agents 516-520 can send increasing Time To Live (TTL) limited TCP SYN packets to the destination server. In some examples, a TCP SYN acknowledgement (ACK) packet from the destination can be used as a reference if an Internet Control Message Protocol (ICMP) TTL Exceeded message is not received from an intermediate node or a final node. In some aspects, distributed agents 516-520 can send a TCP RST (TCP reset) after receiving the SYN ACK from the server (e.g., to prevent TCP connection). In some cases, the TCP SYN packets and the SYN ACK response from the server can be used to measure one or more network metrics and/or to determine one or more network paths associated with the server. Examples of network metrics can include packet loss (e.g., ratio of sent packets that were ACKed), (2) average network delay (e.g., time between SYN and ACK), and/or (3) network jitter (e.g., average delta between consecutive delays).

In some aspects, controller 514 can determine and/or provide one or more network metrics that are associated with one or more paths (e.g., based on a destination, application, etc.) based on an exit interface that is associated with SP-A 526 and/or SP-B 528. In some examples, controller 514 can determine metrics associated with a primary path as well as the corresponding intermediate path or back-up path. For instance, controller 514 can be configured to have or obtain one or more metrics associated with one or more intermediate physical paths and/or one or more overlay paths.

In some aspects, a back-up path can correspond to that path that is used if/when a failure occurs on a primary path. In some examples, network metrics for one or more back-up paths can be determined prior to occurrence of a failure on the corresponding primary path. In one example, controller 514 can provide edge network device 522 and/or edge network device 524 with the following information:

Application 1—Path 1 (Interface A)—(i) Current Link Network Metrics; (ii) Current Link $1^{st}$ Backup Network Metrics; (iii) Current Link $2^{nd}$ Backup Network Metrics Application 1—Path 2 (Interface B)—(i) Current Link Network Metrics; (ii) Current Link $1^{st}$ Backup Network Metrics; (iii) Current Link $2^{nd}$ Backup Network Metrics In some aspects, network metrics can include latency, jitter, packet loss, and/or any other network metric. Table 1 (below) shows an illustrative example of a network metric (e.g., latency) associated with an exit interface corresponding to SP-A 526 and SP-B 528.

TABLE 1

| Exit Interface | Latency-Current Link | Latency-$1^{st}$ Backup Link on Failure | Latency-$2^{nd}$ Backup on Failure |
| --- | --- | --- | --- |
| Service Provider A 526 | 20 ms | 40 ms | 99 ms |
| Service Provider B 528 | 10 ms | 110 ms | 199 ms |

Referring to Table 1, edge network device 522 and/or edge network device 524 can determine an exit interface based on a network metric associated with one or more back-up paths. For example, edge network device 522 can determine that traffic associated with a particular application or destination requires a latency that is less than 100 ms. Although the latency of the current link favors selection of the exit interface corresponding to SP-B 528 (latency of 10 ms is less than 20 ms), edge network device 522 can select the exit interface corresponding to SP-A 526 based on latency metrics for backup links on failure. For example, edge network device 522 can determine that if a failure occurs on primary path associated with SP-B 528, the latency associated with backup path is greater than the required threshold (e.g., greater than 100 ms). Similarly, edge network device 522 can determine that if a failure occurs on primary path associated with SP-A 526, the latency associated with both backup paths is less than the required threshold value for the application (e.g., less than 100 ms).

Figure 6:
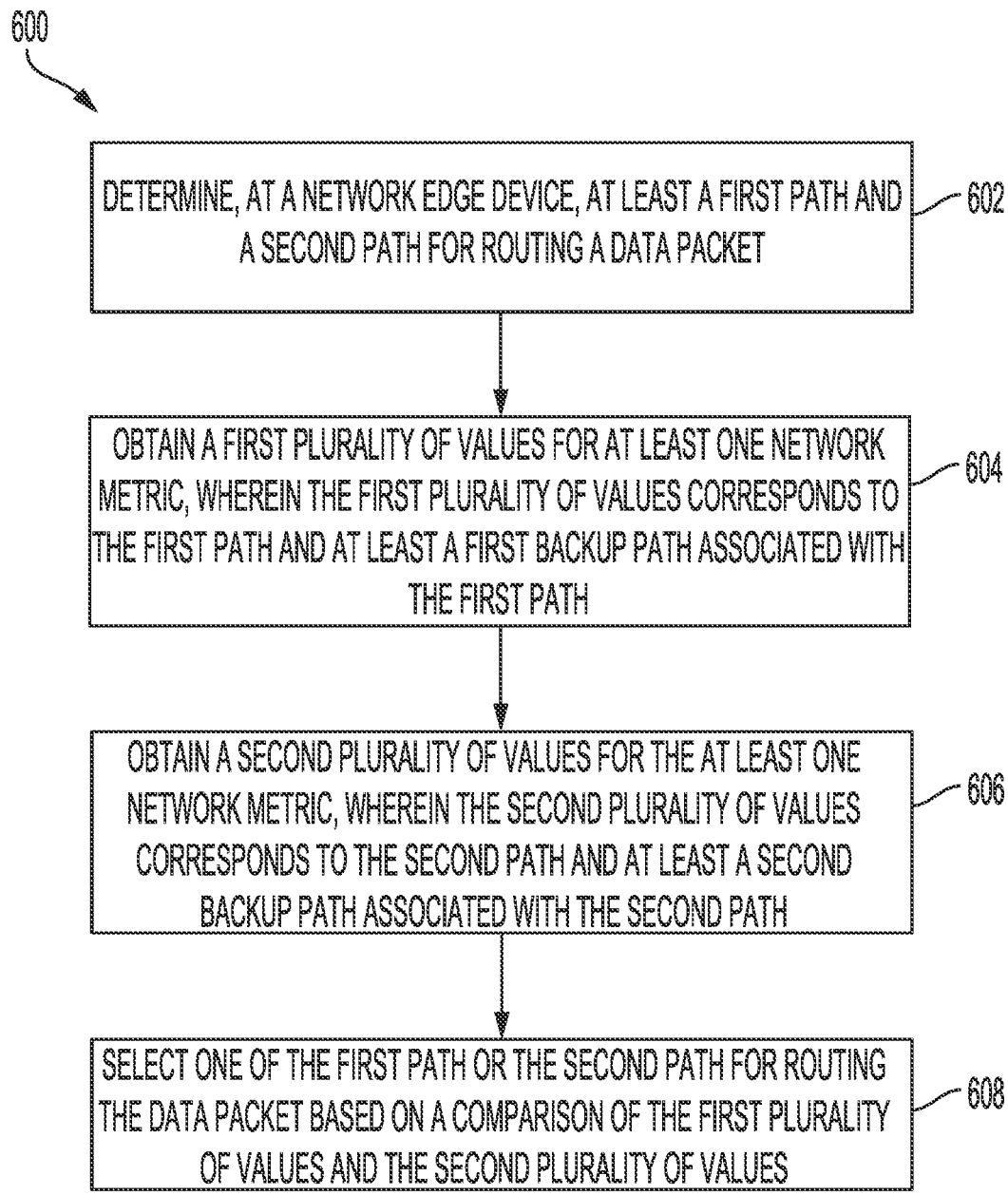
FIG. 6 illustrates an example of a flowchart showing a method for selecting an exit interface based on intermediate paths.

FIG. 6 illustrates an example of a method 600 for selecting an exit interface. At block 602, the method 600 includes determining, at a network edge device, at least a first path and a second path for routing a data packet. For example, edge network device 522 can determine that a data packet can be routed using a first path corresponding to SP-A 526 and that the data packet can be routed using a second path corresponding to SP-B 528.

At block 604, the method 600 includes obtaining a first plurality of values for at least one network metric, wherein the first plurality of values corresponds to the first path and at least a first backup path associated with the first path. In some aspects, the at least one network metric is at least one of a latency metric, a packet loss metric, or a jitter metric. For example, edge network device 522 can obtain a first plurality of values for at least one network metric (e.g., latency, packet loss, jitter, etc.) corresponding to SP-A 526 and to one or more backup paths associated with SP-A 526 (e.g., paths that are used to route the data packet upon failure of a first intermediate link on the path corresponding to SP-A 526).

At block 606, the method 600 includes obtaining a second plurality of values for the at least one network metric, wherein the second plurality of values corresponds to the second path and at least a second backup path associated with the second path. For example, edge network device 522 can obtain a second plurality of values for at least one network metric (e.g., latency, packet loss, jitter, etc.) corresponding to SP-B 528 and to one or more backup paths associated with SP-B 528 (e.g., paths that are used to route the data packet upon failure of a first intermediate link on the path corresponding to SP-B 528). In some cases, the first plurality of values and the second plurality of values are obtained from at least one of a software defined wide area network (SD-WAN) controller and a network intelligence controller. For instance, network edge device 502 can obtain the values for the network metric from controller 514. In some examples, controller 514 can include an SD-WAN controller (e.g., controller appliance 132). In some aspects, controller 514 can include a network intelligence controller (e.g., server) such as a THOUSANDEYES® controller. In some cases, the controller (e.g., controller 514) can have or obtain one or more metrics associated with one or more intermediate physical paths and/or one or more overlay paths.

At block 608, the method 600 includes selecting one of the first path or the second path for routing the data packet based on a comparison of the first plurality of values and the second plurality of values. For example, edge network device 524 can select an exit interface corresponding to SP-A 526 or SP-B 528 based on a comparison of one or more values for one or more network metrics (e.g., based on the current link network parameters and the first backup link network parameters). For instance, as noted in the example listed in Table 1, the backup path for SP-A 526 has value for a network metric (e.g., latency) that is lower than the network metric value associated with the backup path for SP-B 528 (e.g., 40 ms is less than 110 ms). In some aspects, an exit interface corresponding to SP-A 526 can be selected based on network metric value of backup link (e.g., latency of current link for SP-A 526 is greater than latency of current link for SP-B 528).

In some aspects, the method can include determining, based on the comparison, that a first backup value for the at least one network metric that corresponds to the first backup path is less than a second backup value for the at least one network metric that corresponds to the second back up path, and wherein the selecting one of the first path or the second path for routing the data packet comprises selecting the first path. For example, edge network device 524 can determine that the latency for the first backup path associated with SP-A 526 is less than the latency for the first backup path associated with SP-B 528. In some aspects, edge network device 524 can select the first backup path based on the comparison. In some examples, a first value for the at least one network metric that corresponds to the first path is greater than a second value for the at least one network metric that corresponds to the second path (e.g., latency of current link for SP-A 526 is greater than latency of current link for SP-B 528).

In some aspects, the method can include determining, based on the comparison, that a first backup value for the at least one network metric that corresponds to the first backup path is greater than a second backup value for the at least one network metric that corresponds to the second back up path, and wherein the selecting one of the first path or the second path for routing the data packet comprises selecting the second path. For example, edge network device 524 can determine that the latency for the first backup path associated with SP-A 526 is greater than the latency for the first backup path associated with SP-B 528. In some aspects, edge network device 524 can select the second backup path based on the comparison. In some examples, the first backup path is used to route the data packet upon failure of a first intermediate link on the first path. In some aspects, the second backup path is used to route the data packet upon failure of a second intermediate link on the second path.

In some aspects, the method can include determining a required value for the at least one network metric, wherein the required value is based on an application associated with the data packet. For example, the application can include a Software as a Service (SaaS) application provided in a cloud computing environment (e.g., accessed using a service provider). In some examples, the application can be associated with a threshold value for latency, jitter, packet loss, etc. (e.g., a maximum and/or a minimum requirement for one or more network parameters). In some cases, the required value can be determined based on a service level agreement (SLA). In some embodiments, the required value can be learned by the system based on network performance issues (e.g., using artificial intelligence algorithms such as machine learning). In some aspects, the required value for the at least one network metric can be used to select one of the first path or the second path (e.g., the comparison of the first plurality of values and the second plurality of values is based on the required value for the at least one network metric).

Figure 7:
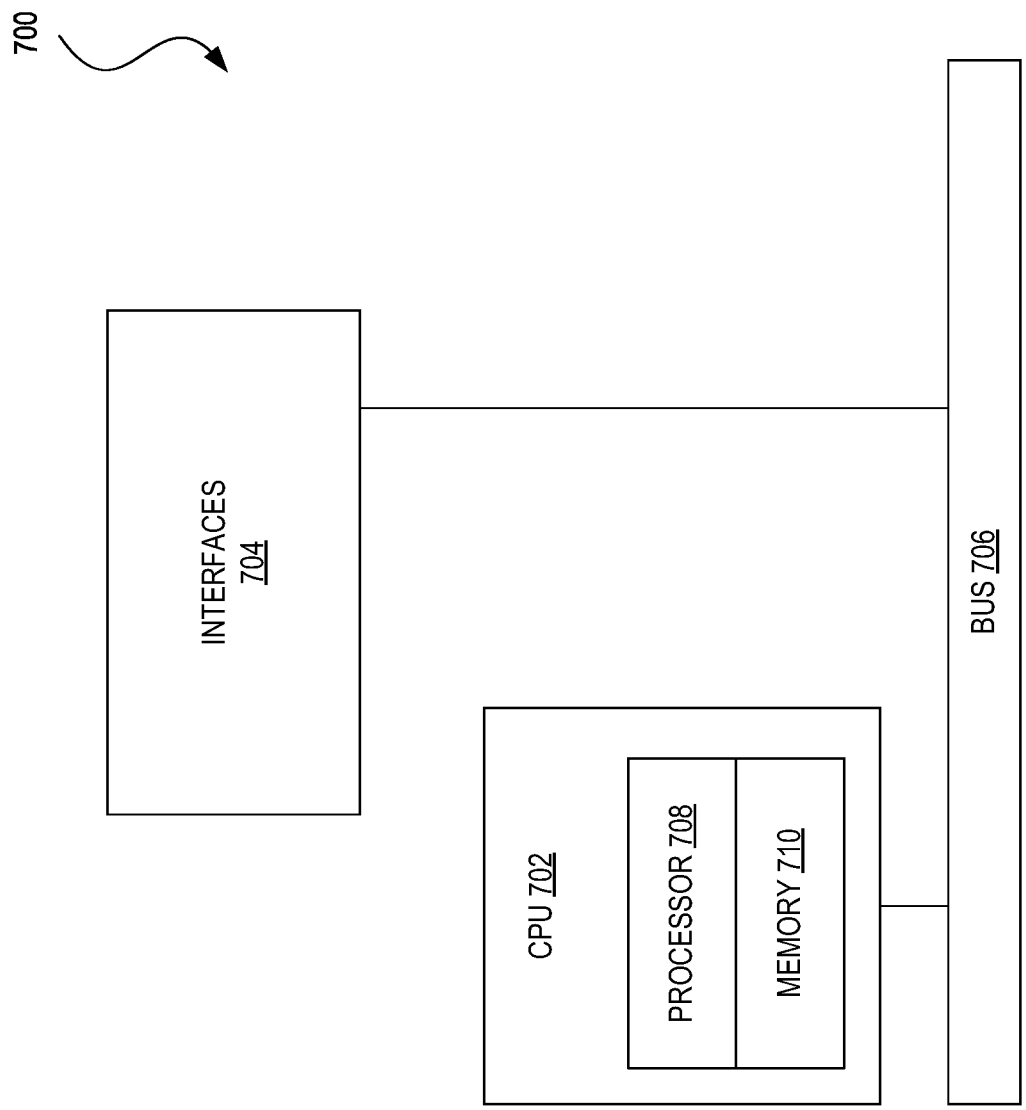
FIG. 7 illustrates an example of a network device in accordance with some examples.

FIG. 7 illustrates an example of a network device 700 (e.g., switch, router, network appliance, etc.). The network device 700 can include a master central processing unit (CPU) 702, interfaces 704, and a bus 706 (e.g., a PCI bus). When acting under the control of appropriate software or firmware, the CPU 702 can be responsible for executing packet management, error detection, and/or routing functions. The CPU 702 preferably accomplishes all these functions under the control of software including an operating system and any appropriate applications software. The CPU 702 may include one or more processors 708 such as a processor from the Motorola family of microprocessors or the MIPS family of microprocessors. In an alternative embodiment, the processor 708 can be specially designed hardware for controlling the operations of the network device 700. In an embodiment, a memory 710 (such as non-volatile RAM and/or ROM) can also form part of the CPU 702. However, there are many different ways in which memory could be coupled to the system.

The interfaces 704 can be provided as interface cards (sometimes referred to as line cards). The interfaces 704 can control the sending and receiving of data packets over the network and sometimes support other peripherals used with the network device 700. Among the interfaces that may be provided are Ethernet interfaces, frame relay interfaces, cable interfaces, DSL interfaces, token ring interfaces, and the like. In addition, various very high-speed interfaces may be provided such as a fast token ring interface, wireless interface, Ethernet interface, Gigabit Ethernet interface, Asynchronous Transfer Mode (ATM) interface, High-Speed Serial Interface (HSSI), Packet Over SONET (POS) interface, Fiber Distributed Data Interface (FDDI), and the like. The interfaces 704 may include ports appropriate for communication with the appropriate media. In some cases, the interfaces 704 may also include an independent processor and, in some instances, volatile RAM. The independent processors may control communication intensive tasks such as packet switching, media control, and management. By providing separate processors for the communication intensive tasks, the interfaces 704 may allow the CPU 702 to efficiently perform routing computations, network diagnostics, security functions, and so forth.

Although the system shown in FIG. 7 is an example of a network device of an embodiment, it is by no means the only network device architecture on which the subject technology can be implemented. For example, an architecture having a single processor that can handle communications as well as routing computations and other network functions, can also be used. Further, other types of interfaces and media may also be used with the network device 700.

Regardless of the network device's configuration, it may employ one or more memories or memory modules (including the memory 710) configured to store program instructions for general-purpose network operations and mechanisms for roaming, route optimization, and routing functions described herein. The program instructions may control the operation of an operating system and/or one or more applications. The memory or memories may also be configured to store tables such as mobility binding, registration, and association tables.

Figure 8:
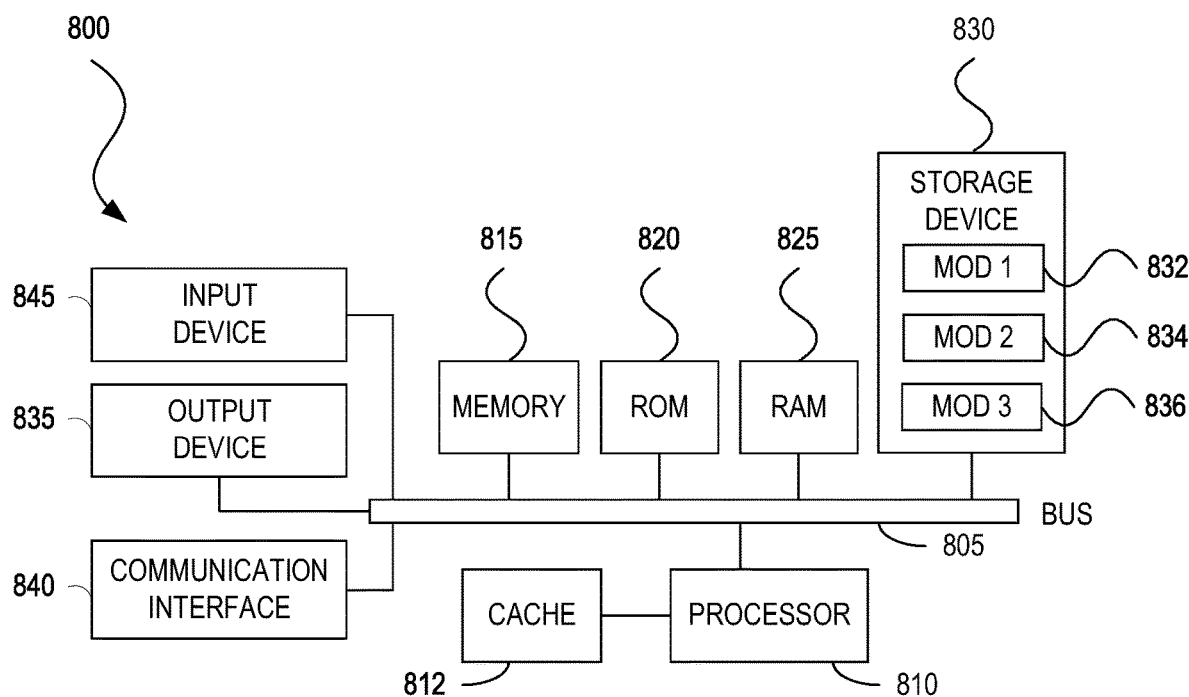
FIG. 8 illustrates an example computing device in accordance with some examples.

FIG. 8 illustrates an example of a bus computing system 800 wherein the components of the system are in electrical communication with each other using a bus 805. The computing system 800 can include a processing unit (CPU or processor) 810 and a system bus 805 that may couple various system components including the system memory 815, such as read only memory (ROM) 820 and random access memory (RAM) 825, to the processor 810. The computing system 800 can include a cache 812 of high-speed memory connected directly with, in close proximity to, or integrated as part of the processor 810. The computing system 800 can copy data from the memory 815, ROM 820, RAM 825, and/or storage device 830 to the cache 812 for quick access by the processor 810. In this way, the cache 812 can provide a performance boost that avoids processor delays while waiting for data. These and other modules can control the processor 810 to perform various actions. Other system memory 815 may be available for use as well. The memory 815 can include multiple different types of memory with different performance characteristics. The processor 810 can include any general purpose processor and a hardware module or software module, such as module 1 832, module 2 834, and module 3 836 stored in the storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction with the computing system 800, an input device 845 can represent any number of input mechanisms, such as a microphone for speech, a touch-protected screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing system 800. The communications interface 840 can govern and manage the user input and system output. There may be no restriction on operating on any particular hardware arrangement and therefore the basic features here may easily be substituted for improved hardware or firmware arrangements as they are developed.

The storage device 830 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 830 can include the software modules 832, 834, 836 for controlling the processor 810. Other hardware or software modules are contemplated. The storage device 830 can be connected to the system bus 805. In some embodiments, a hardware module that performs a particular function can include a software component stored in a computer-readable medium in connection with the necessary hardware components, such as the processor 810, bus 805, output device 835, and so forth, to carry out the function.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, media, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method, comprising:
   determining, at a network edge device, at least a first path and a second path for routing a data packet;
   obtaining a first plurality of values for at least one network metric, wherein the first plurality of values corresponds to the first path and at least a first backup path associated with the first path;
   obtaining a second plurality of values for the at least one network metric, wherein the second plurality of values corresponds to the second path and at least a second backup path associated with the second path; and
   selecting one of the first path or the second path for routing the data packet based on a comparison of the first plurality of values and the second plurality of values.

2. The method of claim 1, further comprising:
   determining, based on the comparison, that a first backup value for the at least one network metric that corresponds to the first backup path is less than a second backup value for the at least one network metric that corresponds to the second backup path, and wherein the selecting one of the first path or the second path for routing the data packet comprises selecting the first path.

3. The method of claim 2, wherein a first value for the at least one network metric that corresponds to the first path is greater than a second value for the at least one network metric that corresponds to the second path.

4. The method of claim 2, wherein the first backup path is used to route the data packet upon failure of a first intermediate link on the first path.

5. The method of claim 1, further comprising:
   determining, based on the comparison, that a first backup value for the at least one network metric that corresponds to the first backup path is greater than a second backup value for the at least one network metric that corresponds to the second backup path, and wherein the selecting one of the first path or the second path for routing the data packet comprises selecting the second path.

6. The method of claim 5, wherein the second backup path is used to route the data packet upon failure of a second intermediate link on the second path.

7. The method of claim 1, wherein the at least one network metric is at least one of a latency metric, a packet loss metric, or a jitter metric.

8. The method of claim 1, further comprising:
   determining a required value for the at least one network metric, wherein the required value is based on an application associated with the data packet.

9. The method of claim 1, wherein the first plurality of values and the second plurality of values are obtained from at least one of a software defined wide area network (SD-WAN) controller and a network intelligence controller.

10. A system comprising:
    one or more processors; and
    at least one computer-readable storage medium having stored thereon instructions which, when executed by the one or more processors, cause the one or more processors to:
    determine at least a first path and a second path for routing a data packet;
    obtain a first plurality of values for at least one network metric, wherein the first plurality of values corresponds to the first path and at least a first backup path associated with the first path;
    obtain a second plurality of values for the at least one network metric, wherein the second plurality of values corresponds to the second path and at least a second backup path associated with the second path; and
    select one of the first path or the second path for routing the data packet based on a comparison of the first plurality of values and the second plurality of values.

11. The system of claim 10, the at least one computer-readable storage medium storing instructions which, when executed by the one or more processors, cause the one or more processors to:
    determine, based on the comparison, that a first backup value for the at least one network metric that corresponds to the first backup path is less than a second backup value for the at least one network metric that corresponds to the second backup path, and wherein first path is selected based on the comparison.

12. The system of claim 11, wherein a first value for the at least one network metric that corresponds to the first path is greater than a second value for the at least one network metric that corresponds to the second path.

13. The system of claim 11, wherein the first backup path is used to route the data packet upon failure of a first intermediate link on the first path.

14. The system of claim 10, the at least one computer-readable storage medium storing instructions which, when executed by the one or more processors, cause the one or more processors to:

determine, based on the comparison, that a first backup value for the at least one network metric that corresponds to the first backup path is greater than a second backup value for the at least one network metric that corresponds to the second backup path, and wherein second path is selected based on the comparison.

15. The system of claim 14, wherein the second backup path is used to route the data packet upon failure of a second intermediate link on the second path.

16. The system of claim 10, wherein the at least one network metric is at least one of a latency metric, a packet loss metric, or a jitter metric.

17. A non-transitory computer-readable storage medium having stored thereon instructions which, when executed by one or more processors, cause the one or more processors to:
   determine, at a network edge device, at least a first path and a second path for routing a data packet;
   obtain a first plurality of values for at least one network metric, wherein the first plurality of values corresponds to the first path and at least a first backup path associated with the first path;
   obtain a second plurality of values for the at least one network metric, wherein the second plurality of values corresponds to the second path and at least a second backup path associated with the second path; and
   select one of the first path or the second path for routing the data packet based on a comparison of the first plurality of values and the second plurality of values.

18. The non-transitory computer-readable storage medium of claim 17, comprising instructions which, when executed by one or more processors, cause the one or more processors to:
   determine, based on the comparison, that a first backup value for the at least one network metric that corresponds to the first backup path is less than a second backup value for the at least one network metric that corresponds to the second backup path, and wherein first path is selected based on the comparison.

19. The non-transitory computer-readable storage medium of claim 17, comprising instructions which, when executed by one or more processors, cause the one or more processors to:
   determine, based on the comparison, that a first backup value for the at least one network metric that corresponds to the first backup path is greater than a second backup value for the at least one network metric that corresponds to the second backup path, and wherein second path is selected based on the comparison.

20. The non-transitory computer-readable storage medium of claim 17, wherein the at least one network metric is at least one of a latency metric, a packet loss metric, or a jitter metric.

* * * * *